United States Patent
Hoppe

(10) Patent No.: US 6,930,415 B2
(45) Date of Patent: Aug. 16, 2005

(54) ELECTRIC LINEAR MOTOR, AND SECONDARY FOR A LINEAR MOTOR

(75) Inventor: Thomas Hoppe, Schwabhausen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/825,591

(22) Filed: Apr. 15, 2004

(65) Prior Publication Data

US 2004/0232778 A1 Nov. 25, 2004

Related U.S. Application Data

(63) Continuation of application No. PCT/DE02/03782, filed on Oct. 7, 2002.

(30) Foreign Application Priority Data

Oct. 19, 2001 (DE) ......................................... 101 51 725

(51) Int. Cl.[7] .............................................. H02K 41/02
(52) U.S. Cl. ........................................................ 310/12
(58) Field of Search ........................ 310/12–14; 104/307

(56) References Cited

U.S. PATENT DOCUMENTS

| | | | |
|---|---|---|---|
| 3,954,037 A | 5/1976 | Rios | 83/794 |
| 4,798,985 A | 1/1989 | Chitavat | 310/90 |
| 5,088,593 A | 2/1992 | Lewin | 198/619 |
| 5,179,304 A | 1/1993 | Kenjo et al. | 310/12 |
| 5,778,758 A | 7/1998 | Barth et al. | 92/88 |
| 6,271,606 B1 | 8/2001 | Hazelton | 310/12 |

FOREIGN PATENT DOCUMENTS

| | | | |
|---|---|---|---|
| DE | 196 05 387 C2 | 8/1997 | |
| DE | 197 38 988 A1 | 3/1998 | |
| DE | 198 37 212 A | 2/2000 | |
| DE | 198 53 250 A | 5/2000 | |
| JP | 01 186103 A | 7/1989 | |
| JP | 10 032973 A | 2/1998 | |

*Primary Examiner*—Thanh Lam
*Assistant Examiner*—Judson H. Jones
(74) *Attorney, Agent, or Firm*—Henry M. Feiereisen

(57) ABSTRACT

An electric linear motor includes a rotor as primary; and a secondary which is spaced from the rotor to define an air gap therebetween for interaction between the rotor and the secondary. The secondary has a carrier with electrically and/or magnetic driving elements, a cover for protection of the carrier against contamination or damage, and a support unit which supports the cover for movement relative to the carrier. Thus, contaminated regions of the cover can be removed from the surface of the secondary and cleaned by a wiper element.

18 Claims, 1 Drawing Sheet

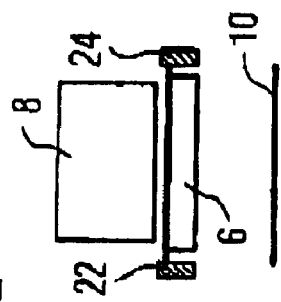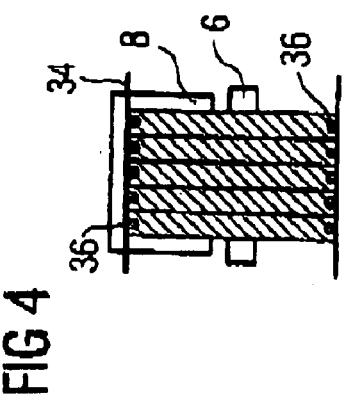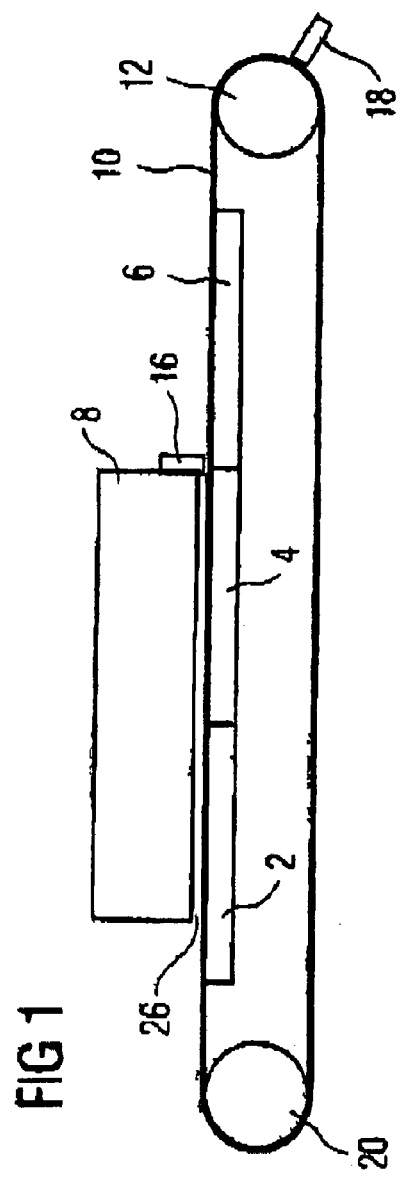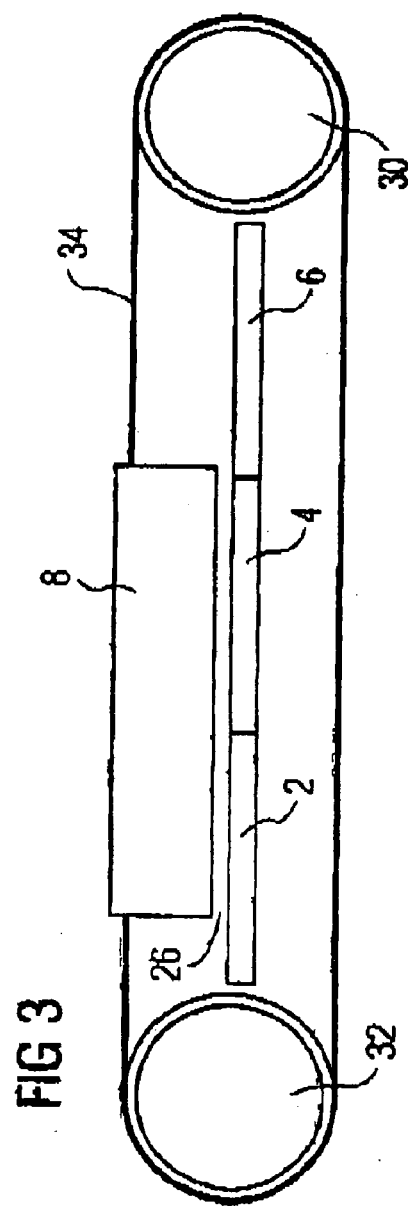

ELECTRIC LINEAR MOTOR, AND SECONDARY FOR A LINEAR MOTOR

CROSS-REFERENCES TO RELATED APPLICATIONS

This application is a continuation of prior filed copending PCT International application No. PCT/DE02/03782, filed Oct. 7, 2002, which designated the United States and on which priority is claimed under 35 U.S.C. §120, the disclosure of which is hereby incorporated by reference.

This application claims the priority of German Patent Application, Ser. No. 101 51 725.4, filed Oct. 19, 2001, pursuant to 35 U.S.C. 119(a)–(d), the disclosure of which is incorporated herein by reference.

BACKGROUND OF THE INVENTION

The present invention relates to the field of linear motors, and in particular to linear motors having a covered secondary.

In general, a linear motor includes a, normally fixed, secondary or reactive part, having in case of a synchronous linear motor a plurality of magnetic elements (permanent magnets) arranged side-by-side to define a guideway for a rotor which is movable relative thereto and represents the primary of the linear motor. The rotor interacts with the magnets of the secondary and converts this interaction into a translatory motion.

Such linear motors are used as drives in various technological fields, for example, in machine tools, machining devices such as automatic drills, automatic milling cutters, automatic lathes, automatic placement machines or automatic bonding machines, including vehicle drives in magnetic levitation trains, etc.

In particular, when the linear motor is exposed to rough operating conditions, the secondary is covered for protection from dust, operating liquid, aggressive substances or chips. German patent publication no. DE 198 53 250 describes a cover for a secondary of an electric linear motor. The cover is made of low ferromagnetic material and is held by magnetic force on the secondary, which carries permanent magnets. Although the secondary is protected from dropping material, there is still the problem that material remains on the cover and may migrate into the air gap between the primary and the secondary.

It would therefore be desirable and advantageous to provide an improved secondary to obviate prior art shortcomings and to allow replacement and/or cleaning of a cover in a simple manner.

SUMMARY OF THE INVENTION

According to one aspect of the present invention, a secondary of an electric linear motor includes a carrier having electrically and/or magnetic driving elements, a cover for shielding the carrier, and a support unit supporting the cover for movement relative to the carrier.

The present invention resolves prior art problems by movably supporting the cover in relation to the carrier. In this way, it is possible to withdraw a soiled or damaged area of the cover from the respective region of the secondary, while keeping dirt away from the air gap of the linear motor.

According to another feature of the present invention, the cover may be an elongate flexible band which runs across the surface of the secondary and extends through the air gap between the secondary and the rotor, representing the primary. Suitably, the support unit includes at least two deflection members, such as drums or rollers, which are disposed in movement direction of the rotor on the ends of the secondary, with the cover being trained over the deflection members. The deflection members may hereby be constructed as storage member and take-up member, respectively. As an alternative, the band may also be constructed as a continuous band which is routed around the secondary via deflection members, such as drums or rollers. One of the deflection members may hereby represent a take-up member with a manual or motor drive that moves the band, when needed and/or in fixed time intervals.

According to another feature of the present invention, the secondary may include a wiper element which sweeps across a surface of the band for removing pollutants from the band and which may be disposed in the area of the drums or rollers and/or of the rotor.

Instead of providing a movement by the cover independently from the rotor, it is, of course, also conceivable to secure the cover directly to the rotor. In this way, the cover is moved by the rotor. Hereby, the cover may be constructed, for example, as a continuous band which runs about the secondary and has ends secured to both ends extending in movement direction of the linear motor, and which is guided about deflection rollers or drums.

According to another feature of the present invention, the cover may be comprised of two cover portions, each of which having one end secured to one end of the carrier and another end secured to the rotor. Suitably, each cover portion is constructed for folding in movement direction of the rotor. Thus, as the rotor moves, the leading cover portion positioned in movement direction ahead of the rotor is folded, while the trailing cover portion is unfolded.

According to another feature of the present invention, the cover may include electrical lines for feeding the rotor.

According to another aspect of the present invention, a linear motor includes a rotor as primary, and a secondary spaced from the rotor to define an air gap therebetween for interaction between the rotor and the secondary, wherein the secondary includes a carrier with electrically and/or magnetic driving elements, a cover for shielding the carrier, and a support unit supporting the cover for movement relative to the carrier.

To ensure clarity, it is necessary to establish the definition of several important terms and expressions that will be used throughout this disclosure. The term "secondary" is used in the description to generally refer to the stationary part, regardless whether the secondary has active elements such as windings, or passive elements such as magnets. The term "rotor" is used here in a generic sense and relates generally to the moving part of a linear motor, regardless whether the rotor has active elements such as windings, or passive elements such as magnets. The term "linear motor" is used here in a generic sense and the principles described in the following description with respect to the linear motor are equally applicable to any other type of motor which generally follows the concepts outlined here. Examples include d.c. motor, asynchronous motor, or synchronous motor.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic side view of one embodiment of a linear motor according to the present invention;

FIG. 2 is a schematic front view of the linear motor of FIG. 1;

FIG. 3 is a schematic side view of another embodiment of a linear motor according to the present invention;

FIG. 4 is a schematic front view of the linear motor of FIG. 3.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic side view of one embodiment of a linear motor according to the present invention, including a secondary which is comprised of a plurality of carriers 2, 4, 6 arranged side-by-side and provided with permanent magnets (not shown) which may be attached to or inserted in the carriers 2, 4, 6. The secondary interacts via an air gap 26 with a rotor 8 as primary which moves along a guideway defined by the secondary. As stated above, the term "rotor" is used here in a generic sense and generally refers to the moving part of the linear motor in relation to the secondary (to the side in FIG. 1).

Structure and operation of a linear motor, such as a synchronous linear motor, as shown here in the drawing, are generally known to the artisan so that a detailed description thereof is omitted here for the sake of simplicity. It will also be appreciated by persons skilled in the art that the linear motor must contain much mechanical apparatus which does not appear in the foregoing Figures, e.g. supports, guides, etc. However, this apparatus, like much other necessary apparatus, is not part of the invention, and has been omitted from the Figures for the sake of simplicity.

Disposed above the secondary in the form of the carriers 2, 4, 6 and extending through the air gap 26 is a cover 10 in the form of a flexible endless band which is routed about deflection drums 12, 20. The cover 10 may be made of flexible plastic, fiber-reinforced plastic or also fabric. The deflection drums 12, 20 are also constructed to maintain the cover 10 taut so that the cover 10 sits smoothly and flat upon the carriers 2, 4, 6. One of the deflection drums 12, 20 is suitably provided with a drive in the form of a motor or a crank so that the cover 10 travels about the deflection drums 12, 20.

Disposed on one or both ends of the rotor 8 is a wiper element 16 in the form of a brush or scraper. As the rotor 8 moves, pollutants deposited on the cover 10 are pushed by the wiper element 16 to the ends of the guideway of the rotor 8 and thus kept away from the air gap 26.

As soon as the pollution of the cover 10 reaches a certain level, or in regular intervals, the cover 10 is advanced about the drums 12, 20 to move polluted regions of the cover 10 away from the movement range of the rotor 8. Pollutants on the surface of the cover 10 are removed by a further wiper element 18.

As shown in particular in FIG. 2, lateral guides 22, 24 are provided in the area of the carriers 2, 4, 6 to prevent the cover 10 from laterally sliding off the secondary.

Referring now to FIG. 3, there is shown a schematic side view of another embodiment of a linear motor according to the present invention. Parts corresponding with those in FIG. 1 are denoted by identical reference numerals and not explained again. The description below will center on the differences between the embodiments. In this embodiment, provision is made for a cover 34 constructed in the form of an elongate band and connected to the rotor 8. The band 34 is wrapped about deflection rollers 30, 32 and moved conjointly with the rotor 8. In this way, the air gap 26 is upwardly covered in every position of the rotor 8 so that material is prevented from reaching from above into the air gap 26. As the cover 34 is directly connected to the rotor 8, it is possible to equip the cover 34 with electric lines 36 for feeding of the rotor 8, as shown in FIG. 4.

The provision of a separate drive for propelling one of the deflection rollers 30, 32 can be omitted here as the cover 34 is directly moved by the rotor 8.

Instead of a single-piece band, it is also conceivable to construct the cover 34 in the form of two foldable cover portions, whereby each cover portion has one end secured to the rotor 8 and another end fixed stationarily to the adjacent one of the deflection rollers 30, 32. As the rotor 8 moves, the one cover portion positioned ahead of the rotor 8 in movement direction folds, whereas the other cover portion, trailing the rotor 8, unfolds or opens up.

The cover 34 may also be made of flexible plastic, fiber-reinforced plastic or also fabric.

Although not shown in detail, it is, of course, also possible to combine the embodiments of FIGS. 1 and 3. For example, the continuous band 10 may be secured to the underside of the rotor 8. In this case, the wiper element 16 may be omitted, while the wiper element 18 is optional, as in the first embodiment.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A secondary for an electric linear motor, comprising:
   a carrier including electrically and/or magnetic driving elements:
   a cover for shielding the carrier:
   a support unit supporting the cover for movement relative to the carrier, wherein the support unit includes at least two deflection members, said cover being trained over the deflection members; and
   a drive member operatively connected to at least one of the deflection members for moving the cover.

2. The secondary of claim 1, wherein each of the deflection members is a drum.

3. The secondary of claim 1, wherein each of the deflection members is a roller.

4. A secondary for an electric linear motor, comprising:
   a carrier including electrically and/or magnetic driving elements;

a flexible continuous band in surrounding relationship to the carrier for shielding the carrier;

a support unit supporting the continuous band for movement relative to the carrier; and a wiper element sweeping across a surface of the continuous band.

5. A linear motor comprising:

a rotor as primary; and a secondary spaced from the rotor to define an air gap therebetween for interaction between the rotor and the secondary, said secondary including a carrier with electrically and/or magnetic driving elements, a flexible continuous band for shielding the carrier, and a support unit supporting the continuous band for movement relative to the carrier and including at least two deflection members for guiding the continuous band, wherein the deflection members are disposed in relation to a movement direction of the rotor to a side of the carrier.

6. The linear motor of claim 5, wherein the deflection members are disposed in relation to a movement direction of the rotor on both ends of the carrier.

7. A linear motor, comprising:

a rotor as primary; and a secondary spaced from the rotor to define an air gap therebetween for interaction between the rotor and the secondary, said secondary including a carrier with electrically and/or magnetic driving elements, a flexible continuous band for shielding the carrier, and a support unit supporting the continuous band for movement relative to the carrier and including at least two deflection members for guiding the continuous band, wherein the band is secured to the rotor.

8. A linear motor, comprising:

a rotor as primary; and a secondary spaced from the rotor to define an air gap therebetween for interaction between the rotor and the secondary, said secondary including a carrier with electrically and/or magnetic driving elements, a cover for shielding the carrier, and a support unit supporting the cover for movement relative to the carrier, wherein the cover is a flexible continuous band having one end secured to the rotor, said support unit including two deflection drums guiding the cover and disposed in relation to a movement direction of the rotor on both ends of the carrier.

9. A linear motor, comprising:

a rotor as primary; and a secondary spaced from the rotor to define an air gap therebetween for interaction between the rotor and the secondary, said secondary including a carrier with electrically and/or magnetic driving elements, a cover for shielding the carrier, and a support unit supporting the cover for movement relative to the carrier, wherein the cover has two cover portions, each of which having one end secured to one end of the carrier and another end secured to the rotor.

10. The linear motor of claim 9, wherein each cover portion is constructed for folding in movement direction of the rotor.

11. A linear motor, comprising:

a rotor as primary; and a secondary spaced from the rotor to define an air gap therebetween for interaction between the rotor and the secondary, said secondary including a carrier with electrically and/or magnetic driving elements, a cover for shielding the carrier, and a support unit supporting the cover for movement relative to the carrier, wherein the cover includes electrical lines for feeding the rotor.

12. The linear motor of claim 11, wherein the cover is a flexible continuous band, said support unit including at least two deflection members for guiding the continuous band.

13. The linear motor of claim 12, wherein the deflection members are disposed in relation to a movement direction of the rotor on both ends of the carrier.

14. A linear motor, comprising:

a rotor as primary;

a secondary spaced from the rotor to define an air gap therebetween for interaction between the rotor and the secondary, said secondary including a carrier with electrically and/or magnetic driving elements, a cover for shielding the carrier, and a support unit supporting the cover for movement relative to the carrier; and a wiper element for sweeping a surface of the cover.

15. The linear motor of claim 14, wherein the wiper element is secured to the rotor.

16. The linear motor of claim 14, wherein the wiper element is secured stationary relative to the carrier.

17. The linear motor of claim 14, wherein the cover is a flexible continuous band, said support unit including at least two deflection members for guiding the continuous band.

18. The linear motor of claim 17, wherein the deflection members are disposed in relation to a movement direction of the rotor on both ends of the carrier.

* * * * *